Patented Sept. 9, 1930

1,775,135

UNITED STATES PATENT OFFICE

MICHISUKE NAKAMURA, OF HIRATSUKA MURA, EBARA GUN, TOKYO FU, JAPAN, ASSIGNOR TO SANKYO KABUSHIKI KAISHA, OF MUROMACHI, NIHOMBASHI KU, TOKYO, JAPAN, A CORPORATION OF JAPAN

METHOD OF MANUFACTURING COLORLESS AND TRANSPARENT PHENOL RESIN

No Drawing. Application filed June 24, 1926, Serial No. 118,371, and in Japan September 2, 1925.

The present invention resides in a method of manufacturing phenol resin, which method consists essentially in intermixing an oily condensation product of a phenol and formaldehyde, condensed in the presence of an organic or inorganic acid catalyzer, with a gelatinous condensation product of urea or a derivative thereof and formaldehyde; conducting the mixture into the desired mold after heating and evaporating, or dissolving same with the proper solvent; and then condensing and hardening same with heat. The object of the invention is to obtain a phenol resin which is substantially free of inherent color and may be as colorless and transparent as glass, completely condensed, and free from tendency to develop color on subsequent exposure.

In condensing phenol and formaldehyde in equi-molecular proportions by adding thereto, as a catalyzer a suitable quantity of free acid such as hydrochloric acid, a product as colorless and transparent as glass can be obtained, if evaporation and condensation are continued. However, due to incompleteness of the condensation this transparent product is not only too brittle to stand manipulation, but also owing to free phenol remaining, the color of its surface turns gradually to reddish brown when it comes into contact with the air. Although the hardness of the product may be somewhat increased by increasing the proportion of formaldehyde it is impossible to stop the above phenomenon, which fact makes the product quite unfit for certain uses.

Now, taking advantage of the fact that the hardness of the product is increased by making the molecular proportion of formaldehyde greater than that of the phenol, I have discovered that it is possible to increase both the hardness and strength of the product without destroying its glass-like colorlessness and transparency, by adding a compound of formaldehyde and urea or a derivative thereof to the intermediate product of the phenol and formaldehyde condensed with acid as a catalyzer, thus enabling the phenol to condense to the utmost limit. It is clearly described in the literatures, for example, Berichte 29, (1896). 2438; Beilstein, Bd. 7, 1313 III Aufl; Chemicher-Zeitung, (1897). 460, etc., that urea or a derivative thereof, when combined with formaldehyde, produces a crystalline or gelatinous condensation product.

The acid condensation product of a phenol and formaldehyde becomes brittle if heating is long continued; but on the other hand it turns into a solid substance as colorless and transparent as glass as said before. According to my invention these two phenomena are well utilized and combined. The following is an example of carrying the invention into practice:—

First, prepare the oily condensation product of phenol and formaldehyde, (suitably supplied as formalin) using hydrochloric acid or the like as a catalyzer, to which add 25 to 80 per cent of the gelatinous condensation product produced by heating and condensing a mixture of 1 part of urea with 4.5 to 10 parts of 40% formalin with or without hydrochloric acid or the like as a catalyzer. Then, completely evaporate the water contained therein under vacuum or ordinary atmospheric pressure or by other proper means. If it is desired to obtain the product in solid form, conduct the compound into the desired mold while it still retains the proper fluidity, and harden it by continually heating it in a closed or open vessel for one to five days at the temperature of 80° C. which is to be gradually raised to about 130° C.

In order to prepare a coating composition it is necessary to dissolve the above mixture, dehydrated by evaporation, in the proper solvent, for instance, amyl acetate or a mixture of alcohol and acetone, to which benzol may be added. If this product is heated and condensed according to the above method after being spread on a surface and dried in the air, the coated surface will have a colorless and transparent film formed thereon.

The product obtained according to my invention possesses substantially the same chemical and mechanical properties as the known phenol-methylene condensation product hardened with alkali catalyzer like ammonia, and is substantially free from inherent color, while the latter is uniformly yellow or brown. Again, compared with the merely hardened acid condensation product of phenols and formaldehyde, the product of this invention is not only incomparably greater in strength, but is free from tendency to turn reddish brown in the air because of the perfectness of condensation. The quantities given in the foregoing example must be changed properly according to the purpose for which the product is used and the process of operation, but if the proportion of formaldehyde as compared with urea is below the above proportion, the product will sometimes assume a muddy white color. Also, if the quantity of formaldehyde used is less than that given in the example, it requires much time to harden the product. Besides, the product is apt to have air bubbles or cracks produced within it. Further, if the quantity of gelatinous condensation product of urea and formaldehyde is smaller than about 25% of the oily condensation product of phenol and formaldehyde, the product tends to become yellow in proportion to the deficiency, while, if it is too large, many hours hardening and heating are required.

In this invention, if the proper quantity of a solid solvent such as an ester, higher alcohol, camphor, etc. is added at the suitable time during the manufacture of the condensation product, it will facilitate the work and also give the product some elasticity. If it is desired to give the product a milk-white color like ivory, white coral, etc., it is only necessary to add such substances as stearic acid, oleic acid, camphor oil, etc. which retain their milky appearance without dissolving in the condensation product. Then, if a suitable dye stuff or pigment is added thereto, it will be colored distinctly as desired. It is to be understood that in practicing my invention carbolic acid (phenol), formaldehyde (or formalin) and urea may be substituted respectively by other phenols (for instance, cresol or the like), a substance of the same effect as formaldehyde (such as paraformaldehyde, trioxymethylene, etc.) and derivatives of urea (for example, semicarbamide, cyanamide, dicyandiamide, etc).

Claims:

1. Method of preparing resinous condensation products substantially free of inherent color, comprising effecting a condensation of a phenol with formaldehyde to which an effective amount of an acid catalyst has been added to the production of a reactive resin, and further condensing the resulting product in admixture with a condensation product of urea and formaldehyde.

2. Method of preparing resinous condensation products substantially free of inherent color, comprising effecting a condensation of a phenol with formaldehyde to which an effective amount of an acid catalyst has been added to the production of a reactive resin, and further condensing the resulting product in admixture with at least about 25% of a condensation product of urea and formaldehyde.

3. Method of preparing resinous condensation products substantially free of inherent color, comprising effecting a condensation of a phenol with formaldehyde to which an effective amount of an acid catalyst has been added to the production of a reactive resin, and further condensing the resulting product in admixture with from 25% to 80% of a condensation product of 1 part of urea to the formaldehyde content of at least 4.5 parts of 40% formalin.

4. Method of preparing resinous condensation products substantially free of inherent color and which do not become colored upon exposure to air, which comprises mixing an oily reactive condensation product of a phenol and formaldehyde condensed in the presence of an effective amount of an added acid catalyzer with from 25% to 80% of a condensation product of 1 part of urea with from 4.5 to 10 parts of 40% formalin, and further condensing the mixture by heating.

5. Method of preparing a resinous condensation product substantially free of inherent color and which does not become colored upon exposure to air which comprises mixing an oily reactive condensation product of a phenol and formaldehyde condensed in the presence of an effective amount of an added acid catalyzer with 25 to 80 percent of a gelatinous condensation product obtained by heating 1 part of urea with 4.5 to 10 parts of 40% formalin, drying the mixture, and heating the mixture at a temperature of from 80° C. to 130° C.

In testimony whereof I have affixed my signature.

MICHISUKE NAKAMURA.